Fig.1.

Feb. 26, 1935.  H. W. WHITE  1,992,269

COMBINATION REGISTER AND MONEY CHANGER

Original Filed Oct. 2, 1930   9 Sheets-Sheet 2

Inventor
HENRY W. WHITE
Jesse R Stone
Lester B Clark
Attorneys

Feb. 26, 1935.  H. W. WHITE  1,992,269
COMBINATION REGISTER AND MONEY CHANGER
Original Filed Oct. 2, 1930   9 Sheets-Sheet 4

Inventor
HENRY W. WHITE.
Jesse R. Stone
Lester B. Clark
Attorneys

Feb. 26, 1935. H. W. WHITE 1,992,269
COMBINATION REGISTER AND MONEY CHANGER
Original Filed Oct. 2, 1930  9 Sheets-Sheet 5

Inventor
HENRY W. WHITE
By Jesse R Stone
Lester B Clark
Attorneys

Inventor
HENRY W. WHITE
Jesse R Stone
Lester B Clark
Attorneys

Feb. 26, 1935.   H. W. WHITE   1,992,269
COMBINATION REGISTER AND MONEY CHANGER
Original Filed Oct. 2, 1930   9 Sheets-Sheet 7

Inventor
HENRY W. WHITE
Jesse R. Stone
Lester B. Clark
By
Attorneys

Feb. 26, 1935.   H. W. WHITE   1,992,269
COMBINATION REGISTER AND MONEY CHANGER
Original Filed Oct. 2, 1930   9 Sheets-Sheet 8

Inventor
HENRY W. WHITE
Jesse R Stone
Lester B Clark
By
Attorneys.

Feb. 26, 1935.  H. W. WHITE  1,992,269
COMBINATION REGISTER AND MONEY CHANGER
Original Filed Oct. 2, 1930    9 Sheets-Sheet 9

Inventor
HENRY W. WHITE.
Jesse R Stone
Lester B Clark
By
Attorneys.

Patented Feb. 26, 1935

1,992,269

UNITED STATES PATENT OFFICE 1,992,269

COMBINATION REGISTER AND MONEY CHANGER

Henry Walton White, Houston, Tex., assignor of fifty-one per cent to R. V. Whitty, Houston, Tex.

Application October 2, 1930, Serial No. 485,861
Renewed December 26, 1934

7 Claims. (Cl. 235—32)

This invention relates to an improvement in a combination fare box and change making device of the type which is particularly useful on street cars, buses or other vehicles.

Various types of fare boxes and money changing devices have been in use heretofore but in each of them some essential operation necessary to the complete and satisfactory operation of the device was lacking. It is with the idea in mind of providing a compact and economical apparatus which will perform the operations required by such devices and permit the operator of the vehicle to direct his attention to traffic problems, that my machine has been devised.

It is one of the objects of the invention to provide a device which will serve as a fare box and completely register all of the moneys which pass therethrough.

Another object of the invention is to provide a change making device which will operate in combination with a fare box of the character herein described.

Another object of the invention is to provide a combination fare box and change making device which will operate simultaneously and in conjunction with each other so that the moneys received for fares may be dispensed as change when desired.

Still another object of the invention is to provide a mechanism which will receive the moneys as fare and either dispense it as change or discharge it into proper receptacles as required.

Another object of the invention is to provide a coin segregator which is agitated by the operation of the fare box.

It is also an object of the invention to provide a safety mechanism in combination with the fare box and the change making device so that the patron will be protected and the insertion of coins for change will be prohibited except when there is sufficient money in the apparatus to discharge change for that particular coin.

It is also an object of the invention to so devise the apparatus that the operator may manipulate it so as to discharge a quantity of small change but which amount will be at the same time registered against the operator by the machine so that the collector may know that the operator has removed the change.

Another object of the invention is to provide for the segregation of the coins as they are received either as fares, as change or as they are inserted to initially charge the machine in such a manner that the coins will be available for change making purposes.

Other and further objects of the invention such as the release of the proper number of coins for change, the removal of excess coins to the receiving box, and the facility with which the coins are handled, will be readily apparent to those skilled in the art when the following description is considered in connection with the accompanying drawings wherein:

Fig. 14—A is a view of the crank used to empty the machine.

Fare receiving mechanism

Figure 22:
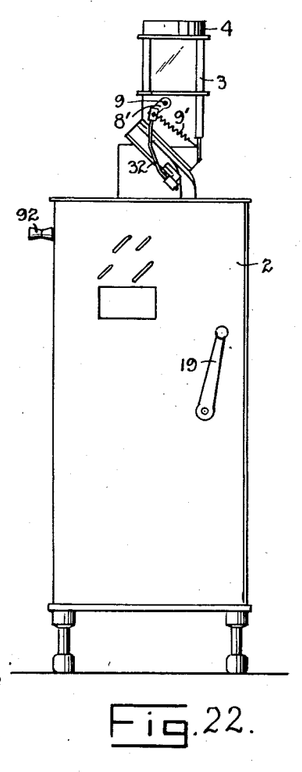
Fig. 22 is a side elevation with the cover plate in position which encloses the left hand side of the case as viewed from Fig. 1.
Figure 23:
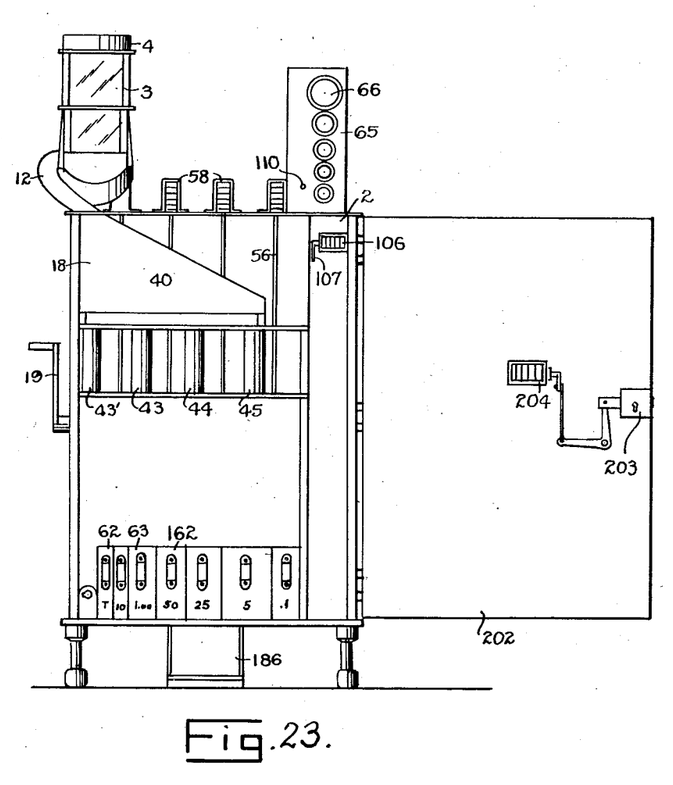
Fig. 23 is a front elevation of the apparatus with the front door in open position and showing the coin receptacle as well as registering mechanism.

It is intended that the fare box will be placed in the vehicle at a point adjacent the entrance of the passengers as is customary. The fare receptacle is indicated in Figs. 22 and 23 which are diagrammatic showings of the mechanism in elevation. The box is provided with a suitable housing 2 which carries on its upper surface the coin receiving mechanism 3. This mechanism is best seen in elevation in section and elevation in Figs. 3 and 4, respectively, and preferably includes the usual sieve 4, which is arranged with a plurality of openings 5 which limit the size of the coins which may be passed into the fare box. As is usual this sieve is mounted upon transparent partitions 6, which are suitably supported by the post members 7. A trap door 8 is provided which is hinged at 9 and normally closed in order that the coins will remain upon the trap door until it is compelled to admit them to the segregating disc 10. This segregating disc may be of any desired construction but in Fig. 3 it is shown as including a disc 10 having grooves 11 on its upper surface. These grooves are arranged to contain pins 17 which are to pick up coins of different size and carry them over to the discharge port 12.

Figure 3:
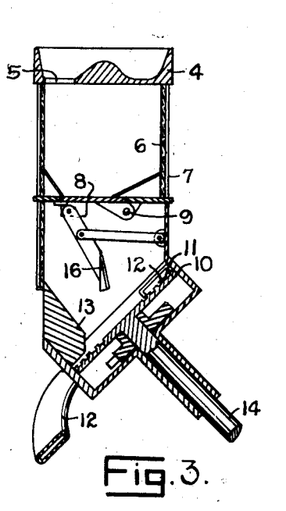
Fig. 3 is a detailed sectional view of the coin segregating mechanism.
Figure 4:
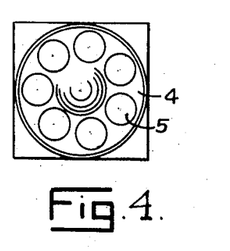
Fig. 4 is a top plan view of the fare receiving and segregating device shown in Fig. 3.

A suitable baffle 13 is provided to make the coins lay flat upon the disc as they are raised. It is understood that the disc 10 is rotated by means of a shaft 14 which is driven by the gear mechanism 15 best seen in Fig. 6. A kicker 16 is connected with the trap 8 so if coins accumulate upon the disc 10 to such number that they engage the kicker 16 it will not allow the trap 8 to open until disc 10 is rotated enough to remove the excess of coins from under kicker 16.

Figure 8:
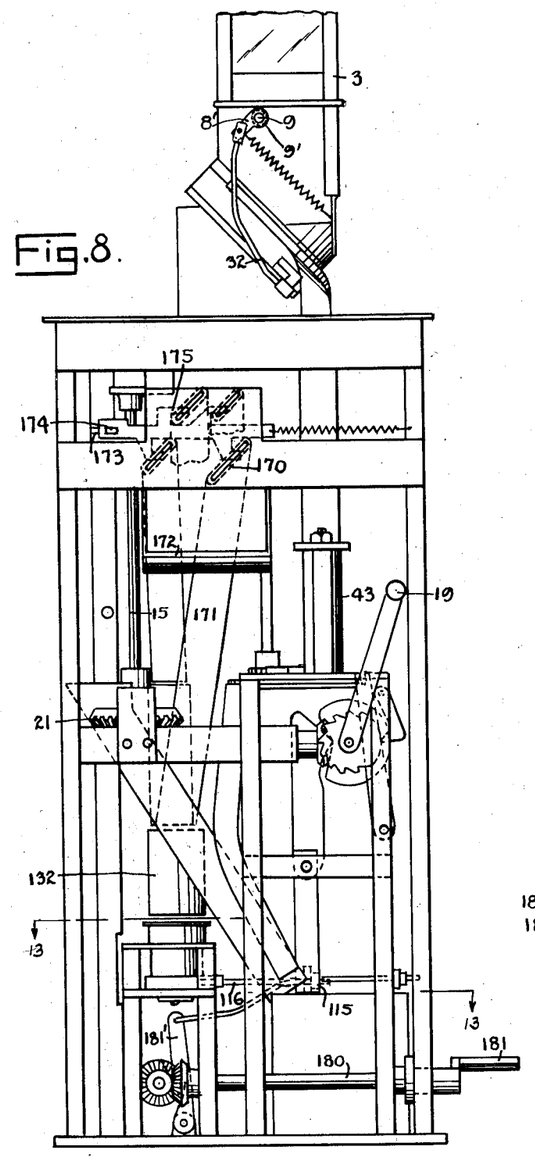
Fig. 8 is a side elevation looking at the left hand side of Fig. 1.
Figure 9:
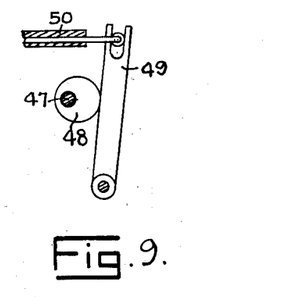
Figs. 9, 10 and 11 are detailed views of cam and lever mechanism which are used in connection with the device, and have been taken on the line 9—9 and 10—10 of Fig. 1 and 11—11 of Fig. 6.
Figure 10:
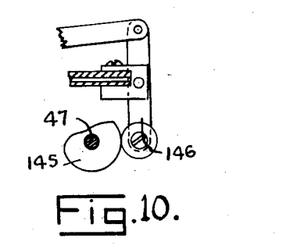

Figs. 8 and 22 of the drawings show a coil spring 9' connecting the lever 8' to the shaft 9 which spring will stretch when the kicker 16 doesn't allow trap 8 to open.

Figure 1:
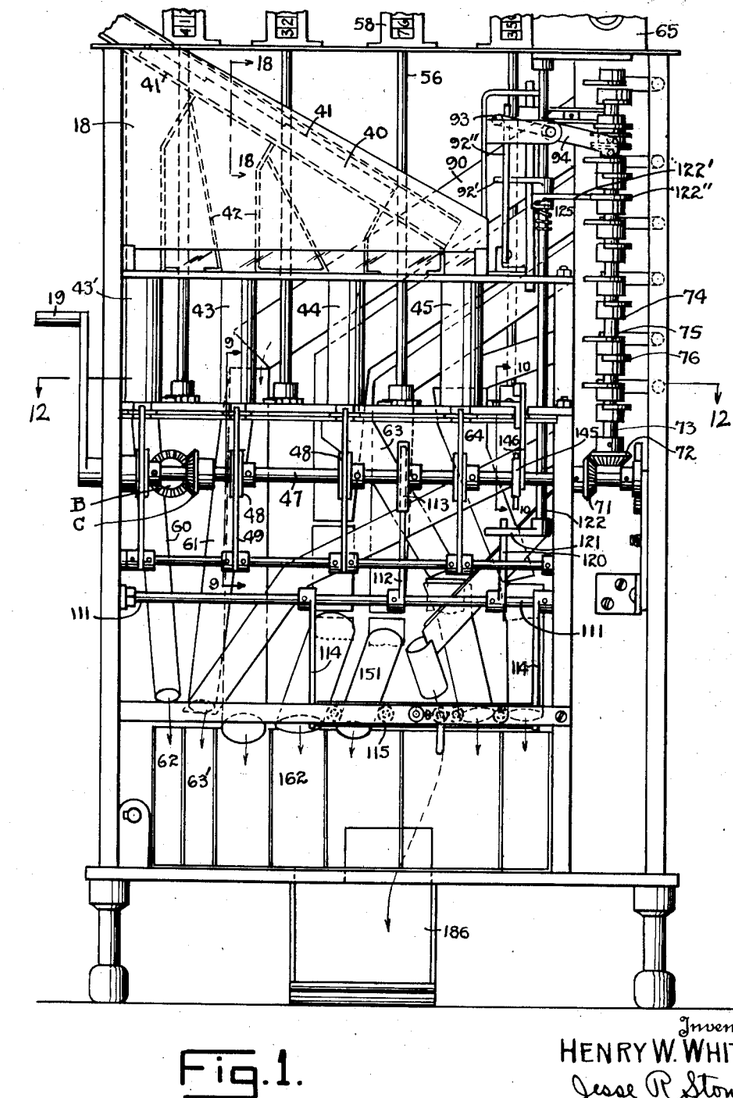
Fig. 1 is a front elevation of the apparatus with the front cover plate removed and showing the various receptacles as well as the internal mechanism.
Figure 5:
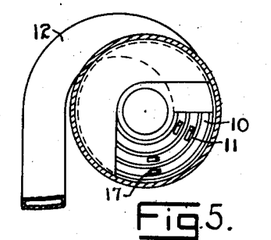
Fig. 5 is a detailed view of the coin segregating disc.
Figures 16, 17, 18:
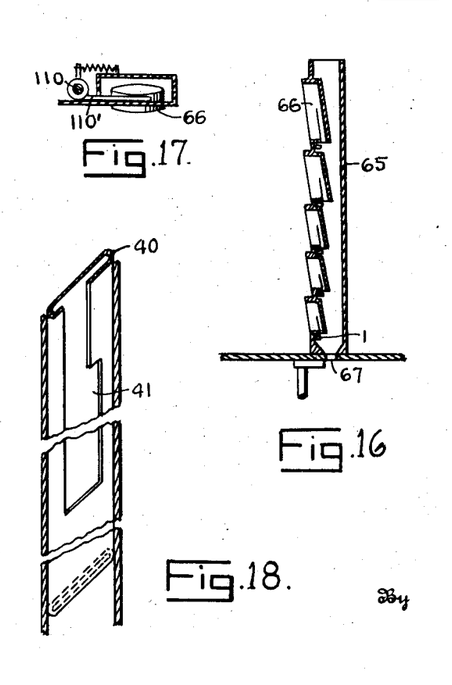
Fig. 17 is a broken sectional view of the stop pins used to prevent insertion of coins when there is insufficient money present to make change therefor.
Fig. 18 is a broken sectional view taken on the line 18—18 in Fig. 1 and showing of one of the coin passages to illustrate how the coins are segregated.

Fig. 5 shows a plan view of the segregating disc 10, the grooves 11 and the pins 17, which serve to contact against the coins and raise them upon rotation of the disc 10. The discharge port 12 continues at an angle away from the disc 10 and is arranged to fit with grooves 11 and for connection with the coin separator track 41 as seen in Fig. 1 and more clearly in Fig. 18. The gear mechanism 15 has been illustrated in this application as being driven by the handle 19 which is connected with the bevel gears B and C and the shaft D in turn to bevel gear 20 which in turn drives the bevel gear 21 and the shaft 15. It is intended in the future development of the invention to provide an electric motor or other suitable device as a substitute for a handle 19 so that the operator of the bus or street car may press upon a button to actuate the fare box by such power unit and eliminate the incessant cranking which must now be performed in order to segregate the coins and make change.

A material advantage may be obtained by the present construction of the fare segregating mechanism due to the fact that the gear ratios between the gear mechanism 15 and the shaft 14 have been altered and the size of the disc 10 has been materially increased so that the coins will be segregated by practically one-fourth of the number of revolutions of the disc 10 which have heretofore been required.

Figures 6, 7:
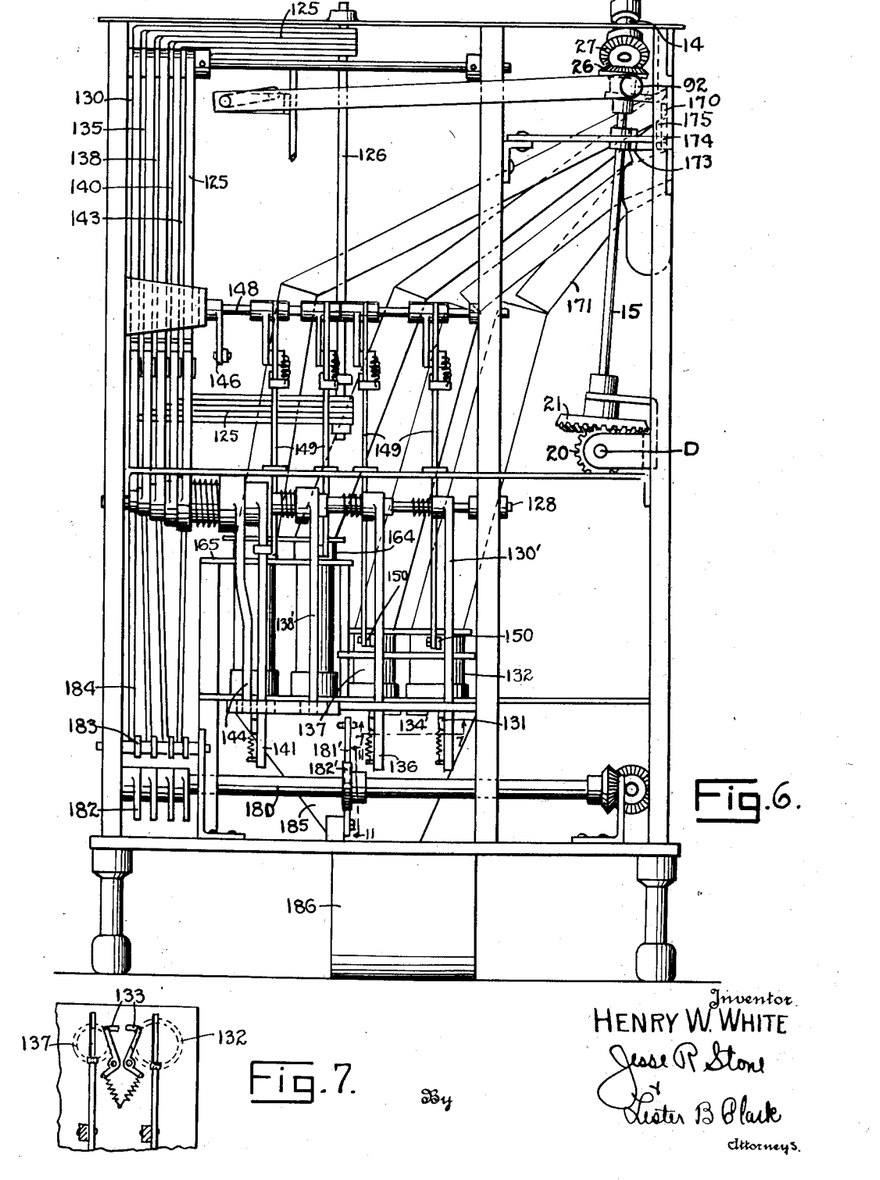
Fig. 6 is a rear elevation of the mechanism looking in a direction opposite to the view of Fig. 1.
Fig. 7 is a broken bottom plan view taken on the line 7—7 of Fig. 6 and shows the fingers which are employed to prevent the misplacement of the coins from the stack.
Figure 24:
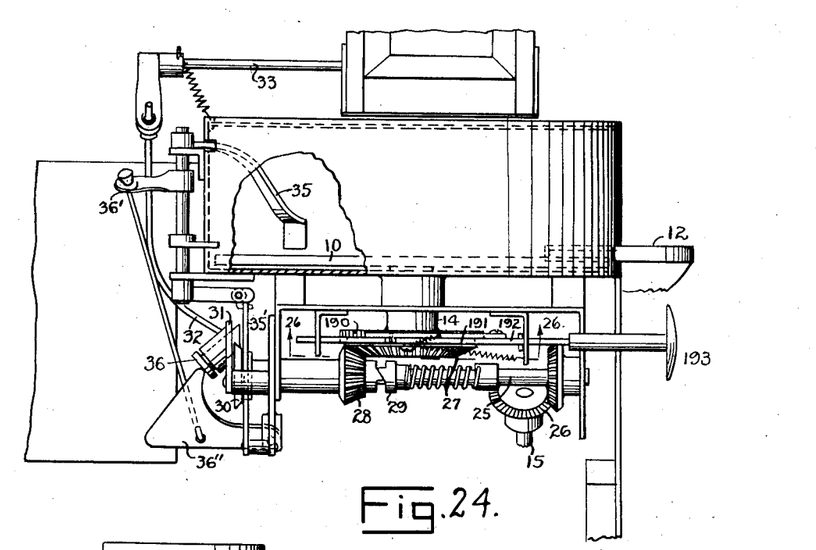
Fig. 24 is a modified form of the coin segregating device taken transversely of the segregative disc and shows fare receiving and segregating mechanism.
Figure 25:
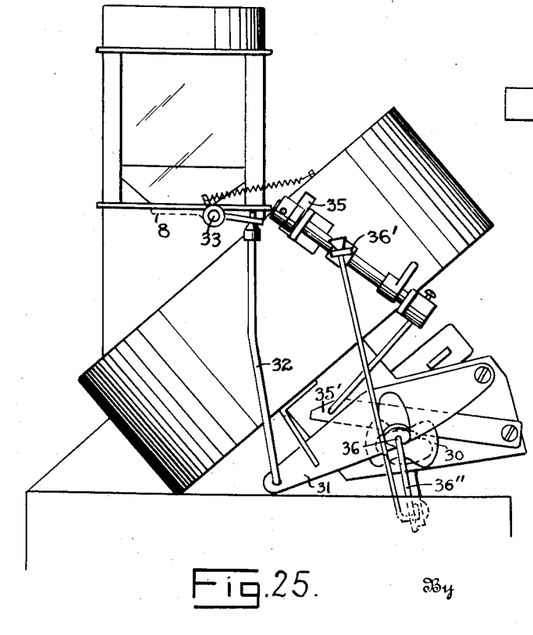
Fig. 25 is an end view of the structure of Fig. 24.
Figure 26:
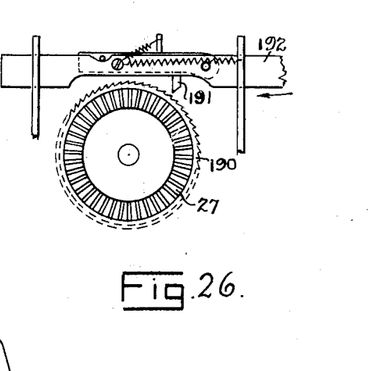
Fig. 26 is a broken bottom plan view of the structure in Fig. 24, taken on the line 26—26 of Fig. 24.

The modification of the driving mechanism for the coin segregating disc shown in Fig. 24 is somewhat different from the one just described and includes an additional shaft 25 which is inserted between the gears 26 and 27 as illustrated in Fig. 6. This shaft permits the movement to one side of the gear 27 so that it is arranged to be driven by a gear 28 which is mounted on this additional shaft 25. A clutch 29 is also provided on this additional shaft so that in event the disc 10 becomes clogged or does not rotate the remaining mechanism of the fare box will not be affected as the slip clutch will compensate for rotation on the shaft 15. This shaft 25 in addition to driving the bevel gear and shaft 14 is provided with a cam 30 adjacent to its end which cam is arranged to oscillate a lever 31 which is in turn connected with a rod 32 and a rock shaft 33 which operates the trap 8. This same cam 30 is also arranged to actuate a lever 35' which in turn moves the knocker lever 35 arranged inside the coin receiver and directly above the rotating surface of the disc 10. This knocker lever is provided in lieu of the kicker 16 shown in Fig. 3 and due to its swinging movement prevents an accumulation of the coins on the disc.

When a considerable quantity of coins accumulate adjacent the lower edge of the disc this knocker arm will be raised above its normal position by the mass of coins. The raising of the knocker arm moves a lever 26' which allows a finger 36'' to drop away from a plunger 36 which is carried by the lever 31. Thus the plunger 36 will not move in to catch on the cam 30 and cause the lever 31 to move to tilt the trap 8. When the trap 8 is closed the coins will accumulate in the glass housing 6 above the trap 8 until such time as the segregating disc has discharged the excess accumulation of coins. As soon as this occurs, the knocker arm 35 will move down to its normal position and raise the finger 36'' to contact the plunger 36, to actuate the lever 31, and the trap 8 which will then continue to be tripped upon operation of the machine. When the trap 8 is again tripped any accumulated coins will fall by gravity into the segregating disc and the operation of the machine will continue satisfactorily.

Coin separating and storing mechanism

When the coins are discharged from the port 12 they are arranged to be received by the separator track-way 18. This track-way is of usual construction and embodies a sleeve 40, Fig. 18, which is positioned at an inclination of about forty-five degrees with the vertical in two directions and is provided with elongated openings 41 of different width on its lower side. These elongated openings are of widths which will permit the passage of either tokens, dimes, pennies, nickels or any other size coin desired, so that as the coins pass into the sleeve 40 by gravity they will slide along at an inclination and when they approach a position adjacent the slot, which will permit their discharge, they fall downwardly between the guide members 42 and are directed into a tube 43. A plurality of these tubes are provided; at 43′ being intended for tokens, 43 for dimes, 44 for pennies and 45 for nickels. In this manner as the coins are discharged from the segregating disc they will be allotted to their respective tubes by separation in the sleeve 40. This same type of machine may, if desired, be constructed to separate and register all coins up to and including one dollar.

While I have shown these tubes or receptacles 43 of considerable length, it is to be understood that they may be shortened in order to reduce the size of the machine if desired, as it is only necessary to have them of sufficient length to accommodate a few coins before they are passed through the counter and moved into a storage position.

Figure 12:
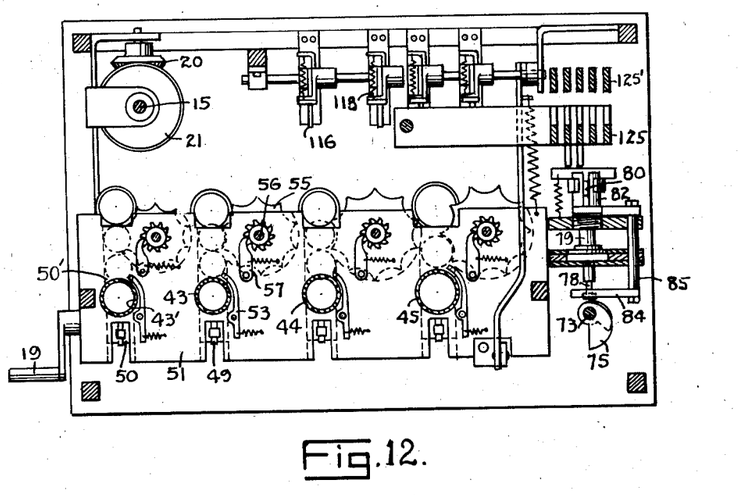
Fig. 12 is a horizontal sectional view taken on the line 12—12 of Fig. 1 and looking in the direction of the arrows.

The mechanism for passing the coins from the receptacles 43 is also driven by the handle 19 or the motor which is intended to be substituted therefor. This driving operation is accomplished by means of the shaft 47 which is mounted in suitable bearings and is provided with a plurality of the cam members 48. These cam members are so arranged that they will engage with levers 49 which are normally retained in a forward position by means of suitable springs which are connected to a brace rod across the center portion of the machine. Each of the levers 49 is arranged to contact with a shuttle 50 which is adapted to slide in grooves provided in the support plate 51, better shown in Fig. 12. It should be noted that there is a shuttle 50 directly beneath each of receptacles 43 and that the shuttle is of about the same width as the coin which is adapted to be received in any particular receptacle. The slot in which the shuttle slides is extended rearwardly beyond the receptacle 43 so there is only space enough in slot to allow one coin to slide out at the time, so that as the shuttle moves forward and rearward it will periodically push a coin from the receptacle 43 into the slot 50′ to the rear of the receptacle. This operation may readily be understood by having reference to Fig. 12 wherein the dotted lines show the passage 50′ and the coins which are moved therethrough. Suitable spring pressed fingers 53 are provided adjacent each one of the receptacles, 43 to hold coin in place upon the sliding movement of the shuttle. The operation of this mechanism embodies a considerable simplification over the machines which are now in use, due to the fact that one coin from each receptacle may be extruded by a single rotation of the line shaft 47 which is driven by the handle 19.

It is intended that suitable counting mechanism may be provided in connection with each of the receptacles 43 or the slots 50′ so that the number of coins which pass therethrough will be registered. This counting mechanism may take any desired form but in the drawings I have shown the counter wheels 55 which are mounted upon shafts 56 which are prevented from return movement by a ratchet finger 57. The shaft 56 is best seen in Fig. 1 and extends upwardly to counting mechanism 58 which will register the number of coins which pass through each of the receptacles.

As the coins are extruded from the counting mechanism the tokens and the dimes will be passed into the chutes 60 and 61 respectively so that they will be deposited in the pockets 62 and 63′. Tokens and dimes are not intended in the operation of this machine to be dispensed as once they are entered in the fare box they are then counted and deposited in the proper pockets so that they may be removed by the collector or inspector for the company.

The pennies and nickels, however, which are received and discharged by the counter mechanism are intended to be used for change making purposes and they will accordingly be passed to a proper storage receptacle by means of the chutes 63 and 64.

Change making apparatus

Figure 19:
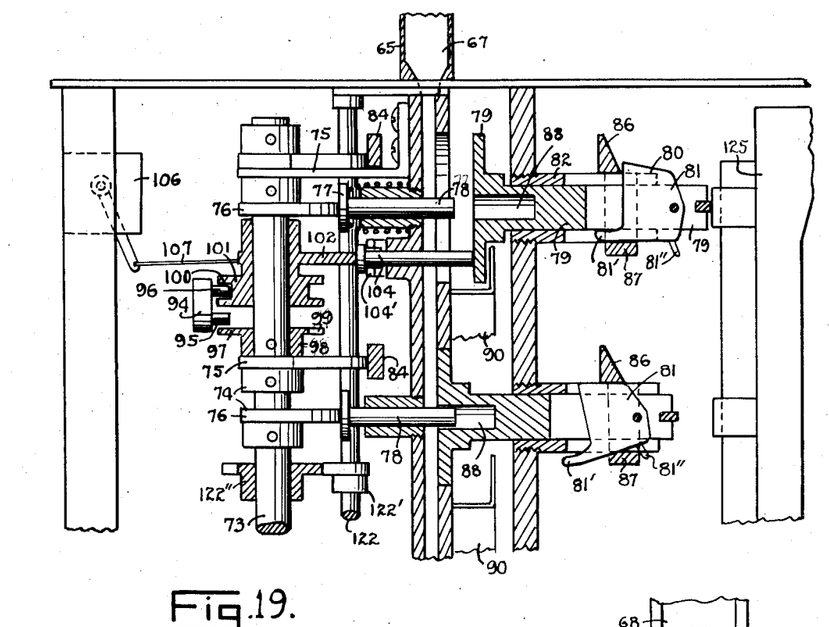
Fig. 19 is a broken sectional view showing the device which is operable upon the insertion of coins to discharge the amount of change proportionately with the coin inserted.
Figure 20:
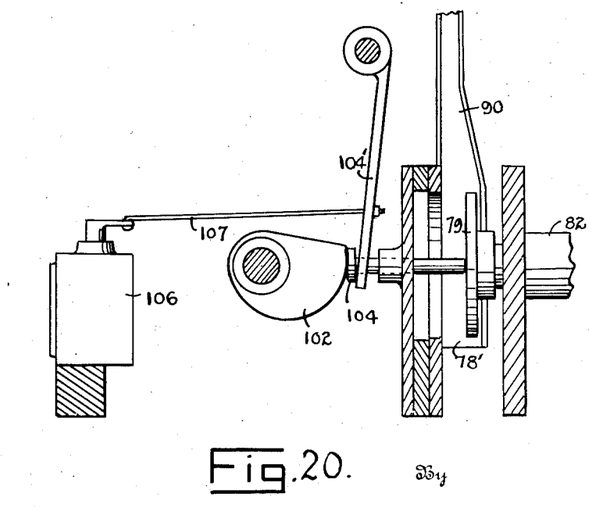
Fig. 20 shows one view of a portion of the change releasing apparatus of Fig. 19 in operation.
Figure 21:
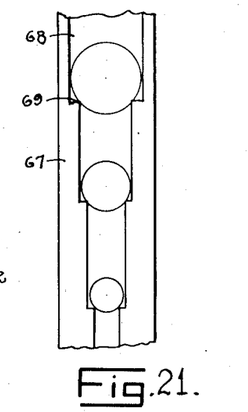
Fig. 21 is another view of the coin receiving chute which is used in combination with the change making device.

In order that the present mechanism may be devised so that it will enable the passengers to obtain change therefrom arrangement has been made for receiving coins which will operate to dispense an equivalent amount of change which may then be used by the passenger for deposit in the fare box. To accomplish this we have provided the coin receiving standard 65, in Fig. 19, which is provided with a plurality of openings 66, Fig. 15, to receive different sizes of coins. The one here illustrated will accommodate dollars, half dollars, quarters, nickels, and dimes in the order mentioned. As is usual with devices of this type the coins are moved into the openings 66 and fall by gravity through the chute 67 which is provided with a plurality of slots 68 of different width, the different width slots being separated by means of the shoulders 69 as best seen in Fig. 21. The coins will fall until they rest upon the proper pair of shoulders 69 which is intended to stop the downward movement of some particular size of coin. When the coin is thus positioned on the shoulders 69 rotation of the handle 19 causes rotation of the shaft 47 which in turn rotates the beveled gear 71 which is seen in Fig. 1. A second gear 72 meshes with the gear 71 and drives a shaft 73. This shaft is provided with a plurality of sets of cams 74. Each set of cams includes two cam members 75 and 76. The cam 76 is arranged to engage a piston 77 which is best seen in Fig. 19. This piston 77 is formed or connected with a push rod 78 which is adapted to extend through the chute 67. A plurality of these rods are arranged at elevations directly above each set of shoulders 69 so that when a coin is stopped upon a shoulder 69 and the machine is operated the push rod 78 will engage against the coin as it rests on the shoulder 69.

When the push rod so engages the coin it pushes it laterally from the shoulder 69 into the opening 78′ so that it may thereafter fall by gravity to a storage receptacle. As this coin moves under pressure of rod 78 it contacts with a piston 79 and causes a sliding movement of this piston. The piston 79 is arranged to slide in a sleeve 80 which has pivoted therein a trigger 81. This trigger 81 is arranged to be engaged by the piston 79 and moved to a position such that it extends above the upper flat surface 82 of the sleeve 80.

The movement of the trigger 81 above the sleeve 80 is caused by the toe 81' thereof sliding against the ring 87 so that the trigger will pivot from the position shown in the lower view of Fig. 19 to the position shown in the upper part of the figure. A small stop pin 81'' is fixed to the trigger to contact the ring 87 and return the trigger to its original position when the piston 79 is retracted.

The upper cam 75 is positioned on the shaft 73 at a different angular position than the cam 76 and is arranged to contact with the bar 84 which operates a rod 85 which in turn moves the trip member 86. This trip member engages against the upper projecting end of the trigger 81 as best seen in Fig. 19. The trigger member 81 is pivoted on the piston 79 which is arranged for sliding movement in the sleeve 80. Thus when the trip member 86 is advanced by the cam 75 after the trigger 81 has been set by the plunger rod 78 it causes an additional movement of the piston 79 beyond its path of travel which would be caused by movement of the plunger rod 78. This is accomplished due to the fact that the cam 75 is of greater radius than the cam 76 and the trigger 81 which is moved up by the member 86. This additional movement of the piston 79 serves to actuate suitable levers 125, Fig. 2, which will extrude a series of coins to equal in smaller change the amount of the coin which has been inserted. A guide ring 87 is connected with the sleeve 80 and serves to limit the downward movement of the trigger 81. Suitable springs are provided adjacent the plungers 77 so that they will normally be retained in position adjacent the cam 76. The additional movement of the piston 79 caused by the trip lever 86 moves the head of the piston away from the coin which has been pinned beneath the piston head 77 and the plunger rod 78. This additional movement there releases the pressure on the coin and permits it to fall by gravity into a chute 90 which leads to either the storage receptacle or to the proper pocket depending upon whether the coin deposited is to be used in the future for change making purposes or to merely be deposited in the machine in the proper pocket so that it may be collected by the inspector.

The piston 79, however, is of hollow construction and is provided with a cavity 88 so that the plunger rod 78 may slide therein in event there is no coin placed in the mechanism for which change is desired. In other words, unless a coin is placed between the piston 79 and the plunger rod 78 the movement of the rod 78 has no effect upon the change making mechanism.

It often occurs that a passenger will present a dollar bill to the motorman or the driver in order to obtain the proper amount of change. Obviously the machine is not devised to make change for a paper bill and under these circumstances it becomes necessary for the vehicle operator to receive the paper money and discharge from the machine a dollar's worth of change. With this in mind a lever 92 is provided as will be seen in Fig. 22. This lever is so arranged that it will actuate the rod 93 in Fig. 14 which will in turn pivot the lever 94, Fig. 19. This lever 94 carries a pair of projecting pins 95 and 96. The pin 95 is adapted to ride normally on the underside of a flange 97 of the wheel 98 which is fastened to the shaft 73. This wheel 98, however, is provided with an opening 99 therein which will permit the pin 95 to pass therethrough and assume its position on the upper side thereof as best seen in Fig. 19. The upper pin 96 is arranged to travel in a groove 100 which is provided in a wheel 101 which is slidably mounted upon this shaft 73 and carries a cam 102. This cam is very similar to the cam 75 which is also mounted on the shaft 73. This cam 102, however, is arranged to contact with a plunger 104 which is similar to the plunger 78 excepting that it is eccentrically of the piston 79 which is adjacent the silver dollar portion of the change chute. In other words, the cam 102 will actuate the plunger 104 to contact the piston 79 and cause its movement the same as if a silver dollar had been placed in the machine for the purpose of obtaining change.

It seems obvious that this operation is carried out in a manner similar to obtaining a dollar's worth of change instead of placing the dollar in the change chute and it is merely necessary for the operator to press on the lever 92. Thus a dollar's worth of change is discharged from the machine without placing the dollar bill therein. The operator now has this dollar bill but each time that the lever 92 is moved and a dollar's worth of change discharged, the counter mechanism 106 is operated by means of the rod 107 which is in turn connected to the plunger 104, by means of the lever 104' which is moved when the plunger 104 moves. In this manner when the inspector or collector appears at the machine he may merely glance at the recorder 106 and demand from the operator the number of dollars which have been recorded by the counter since the last collection period.

Figure 15:
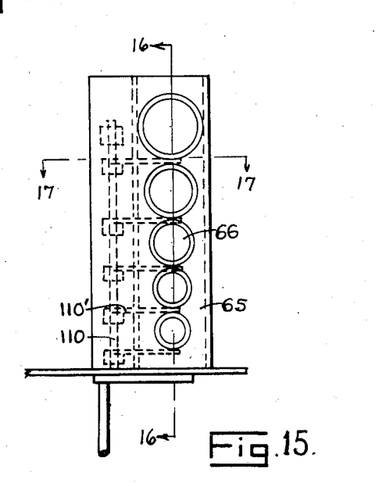
Figs. 15 and 16 are a front elevation and a side section respectively of the coin receiving rack of the change making device.

In event there is insufficient change in the storage receptacles, which are yet to be described, to accommodate any one of the coins which may be inserted in the change making mechanism, I have provided a stop member 110, Fig. 15, which is arranged to be operated to move the pawls 110' into position directly beneath each one of the openings 66 so that the coin which is inserted by the passenger or operator will not drop into the machine. This stop member 110 is operated by means of a shaft 111 best seen in Fig. 1. This shaft is so devised that it will be rocked by means of the finger 112 which is intended to contact with a cam 113 which is rigidly affixed to the line shaft 47. The shaft 111 is arranged also to move the lever 114 which extends downwardly therefrom and has connected therewith the bar 115. This bar is suitably connected to a plurality of plunger rods 116, Fig. 14, each of which enter one of the storage receptacles 117 and is adapted to engage against the coins therein. In event there are no coins in any one of the storage receptacles the springs 118 will pull the bar 115 rearwardly, as the rods 116 will be permitted to enter the receptacle 117 due to the lack of coins therein. This movement of the bar 115 will rock the shaft 111 and cause rocking movement of an additional lever 120. This lever in turn strikes a finger 121 which rotates a shaft 122. This shaft causes movement of the stop member 110, Fig. 15, to such a position that it will prevent the entrance of coins in the opening 66.

In order that coins will not drop from sight thru the openings 66 when they are inserted the stop pins 110 normally prevent falling of the coins but these pins are adaptable to be moved by the bar 122' mounted on the shaft 122. This bar contacts the cam 122'', Figs. 1 and 19, which is rotated by the shaft 73. The bar 122', however, is connected on the shaft 122 by a spring 125 so that if the shaft 122 is held immovable due to lack of coins the bar 122' will rock on the shaft and not retract the stop pins 110.

In event there is insufficient change in the receptacles when the lever 92 is depressed, the finger 92', Fig. 1, will push a shoulder on the lever 92'' beneath the rod 93 so that the movement of the handle 92 will not actuate the lever 94 and no change will be forthcoming.

Figure 2:
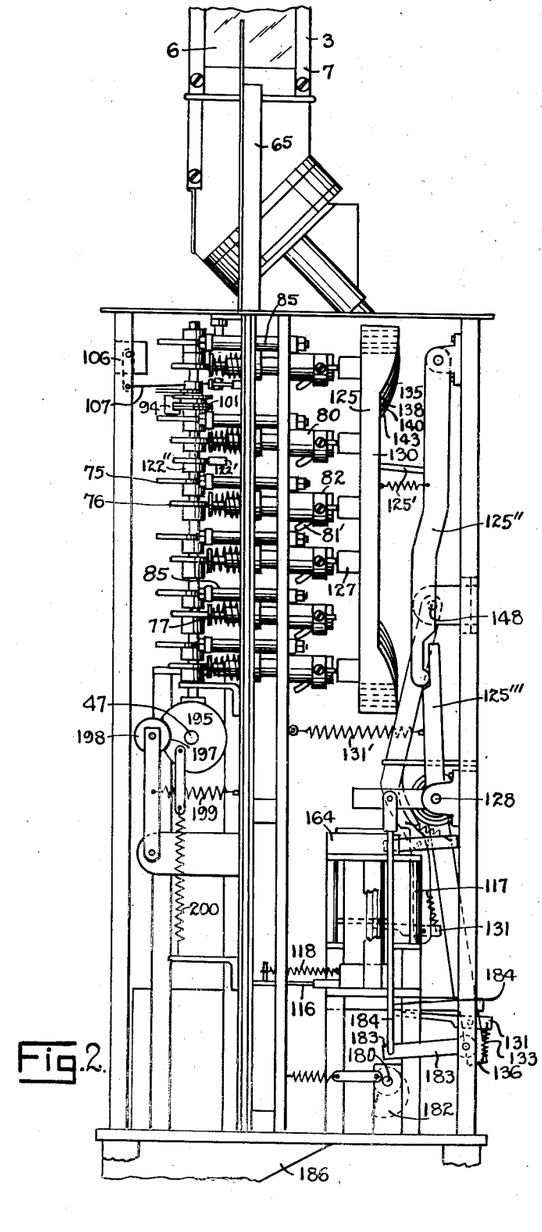
Fig. 2 is a side elevation from the right hand side of the apparatus as viewed in Fig. 1.

The mechanism by which the change will be extruded from the receptacle 117 is best seen in side elevation in Fig. 2 and comprises a plurality of bars 125 which are also seen in a rear elevation in Fig. 6. These bars are in the form of three sided angles pivoted on the rod 126 so that they may have a horizontal swinging movement. Each of these bars is provided with forwardly extending lugs 127. The bars are so arranged and suitably affixed by means of push rods 125' to the transfer bars 125'' which in turn contact the fingers 125''' each of which is connected to one of the concentric sleeves which are so mounted on the shaft 128 Fig. 6 that each of the sleeves may be rotated independently of the others. The bar 130 is connected by means of a sleeve shaft to the lever 130'. This lever is in turn connected to a lever 131, Fig. 13, which is adapted to reciprocate beneath the receptacle 132 which is adapted to contain half dollars. A spring 131', Fig. 2, normally retains this lever 131 in suitable position. The fingers 133, Fig. 7, are adapted to press against the coin which is in the slot 134 directly beneath the receptacle 132. Thus the coin may not be misplaced except when it is moved forwardly by the lever 131. It seems apparent that operation of the bar 130 will, due to its causing pivoted movement of the sleeve surrounding the shaft 128, cause reciprocating movement of the lever 131, and each time the bar 130 is operated it will extrude one half dollar from the receptacle 132. The operation of the bar 130 is caused by the piston 79 which has been briefly described. Each of these pistons 79 is adapted to contact against some one or more than one of the lugs 127. The number of lugs present adjacent the plunger 79 is determined by the amount of change which is to be dispensed when that particular plunger is operated. The bar 135 is connected with the lever 136 which operates suitably under the receptacle 137, Fig. 13, which is adapted to contain quarters. This receiver is exactly the same as the receptacle 132.

Figures 13, 14:
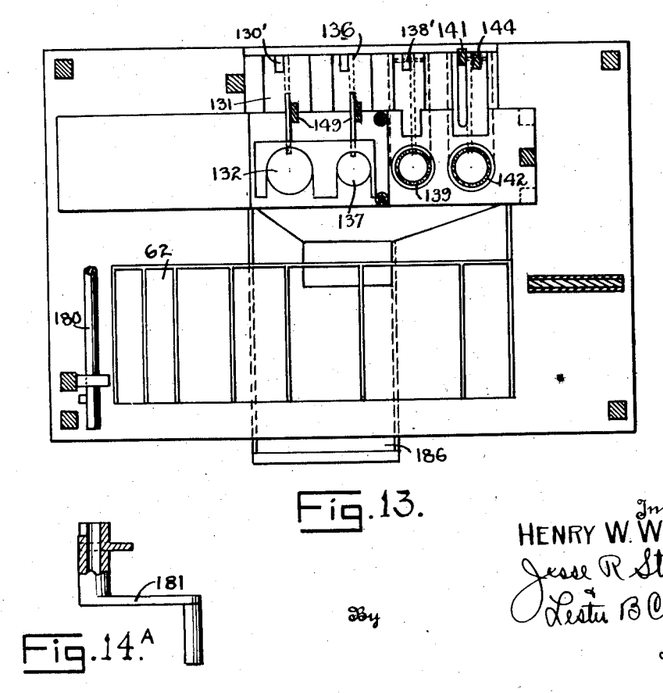
Fig. 13 is a sectional view taken on the line 13—13 of Fig. 8 and looking in the direction of the arrows.
Fig. 14 is a broken sectional view of the mechanism for holding the coins which are to be discharged for change.
Figure 14:
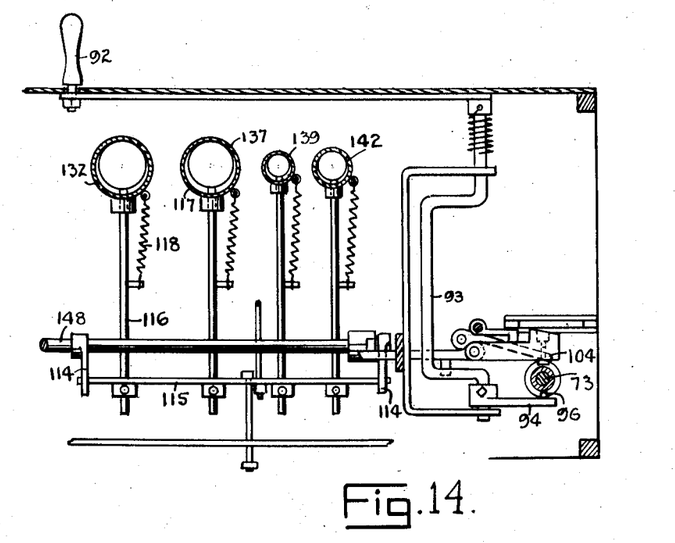

The bar 138 is arranged adjacent the receptacle 139, and lever 138' Fig. 13, which is intended to dispense pennies. The lever 140 is connected with the lever 141 which is adapted to extrude one nickel from the receptacle 142 in a manner similar to the other coins which have been described. An additional lever 143 is provided and is connected with the lever 144 which also operates a shuttle for the nickel receptacle 142. This additional shuttle is arranged to extrude four nickels at a single operation. Thus when a quarter is inserted in the change making apparatus the plunger 79 moves forward and a lug 127 is provided on the lever 143 which will be engaged by the plunger and four nickels will be extruded. This same operation causes the same plunger 79 to contact a lug on the lever 138 so that five pennies will also be extruded and in this manner 25¢ worth of change will be removed from the machine for the quarter which has been inserted. In a like manner the lugs adjacent the plunger 79 which is operated when a dollar is inserted constitute a lug to eject a half dollar, one for a quarter, four nickels and for five pennies. The remaining lugs adjacent the dime and the five cent piece will eject five pennies and a nickel, and five pennies respectively. Suitable springs are placed about the sleeves on the shaft 128 so that the levers which operate the shuttles will be normally retained in retracted position.

The storage receptacles 132, 137, 139, and 142 may be of any desired length in order to maintain therein sufficient change for the usual run of machines of this type. However, in event an excess of coins accumulate beyond that necessary for the requirements of making change and it is desired that these excess coins be cast into a proper pocket where they will be retained until removed by the inspector or collector, there is provided a suitable mechanism for removing the excess coins from the top of the stack in each of the receptacles. This mechanism is operated by means of a cam 145, Fig. 1, which is affixed to the line shaft 47 and is arranged to engage against the lever 146 which is pivoted to the frame of the device. This lever 146 is suitably connected with a rock shaft 148, Fig. 6, which in turn supports the kick off levers 149. There are four of these levers, two of which are arranged to operate a push bar 150 which is adjacent the top of the half dollar receptacle 132 and the quarter receptacle 137. The rocking of the shaft 148 causes a reciprocating movement of the members 150 so that the uppermost coins above the level of the lower side of the lever 150 will be moved forwardly and fall into the chutes 151, Fig. 1, and be deposited in the proper receptacle or pockets 162. The excess coin discharging device in connection with the receptacles 139 and 142 are somewhat different and constitute a sleeve 164 which is adapted to be reciprocated by one of the levers 149 in a manner similar to the reciprocation of the member 150. This sleeve 164 is provided with suitable flanges at its upper and lower ends so that it will slide freely upon the plate 165. It is to be understood that either of the forms of extruding mechanism here described may be used, depending on the size of coin or the facility with which the coin or the movement of coins will need to be extruded by each operation. It has been found in a practical application of the invention that the sleeve is best adapted for pennies and nickels whereas the member 150 is suitable for quarters and half dollars.

*Loading the machine with coins for change making purposes*

Fig. 8 shows an elevation of the mechanism as viewed from the left hand side of Fig. 1 and particularly discloses a plurality of slots 170 which may be used to charge the change making portion of the apparatus with sufficient coins so that it may be put to a practical application. The slots are arranged to receive quarters, half dollars, nickels and pennies. Each of these slots 170 is connected by a suitable chute 171 to the proper receptacle which has previously been described as the holder for that particular size of coin. In this manner a sufficient number of coins may be inserted through the openings 170 so that sufficient amount of change will be advanced. Each of the chutes 171 is provided with an open slot on its underside which is similar to the slot on the underside of the sleeve 40. This slot in each one of the chutes 171 is of sufficient width so that it will permit the escape of any coin other than the exact size to which that chute is adapted to conduct the coin. Thus if a quarter is placed in the half dollar slot it will not pass into the slot 171 but will drop into the cup 172 which is provided for that purpose. A cam 173 is mounted on the shaft 15 and engages a finger 174 which is connected to a plurality of stop pins 175 which extend into the openings 170. Thus these openings are closed except when the handle 19 is rotated to the proper position to withdraw these stop pins which is at a time when the coins may pass into the receptacle in which they are to be stored.

Figure 11:
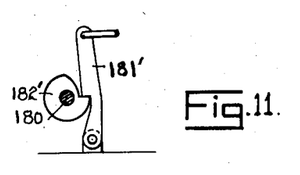

In event it is desired to discharge all of the change from the machine a shaft 180 has been provided to which a detachable handle 181 may be affixed. This shaft 180 is arranged to actuate the cams 182, Figs. 2 and 6, which in turn contact the lever arms 183 which are fastened by means of suitable rods 184 to each of the respective bars 130 and 135, 138 and 143. Fig. 11 shows a cam 182' and lever 181' which is connected to the plungers 116 so that on each turn of crank 181 plungers 116 release a coin out of each of the containers 132, 137, 139, and 142. In this manner rotation of the shaft 180 will actuate the extruding mechanism and all of the coins in the storage receptacles will be extruded therefrom so that they will fall into the chute 185 and be received in the container 186, which is best seen in rear elevation in Fig. 6 and in front elevation in Fig. 1. This container is the one which is adapted to receive all of the coins which are extruded for change making purposes and is at the forward lower side of the mechanism in a convenient position to be reached by the passengers.

Fig. 2 shows a cam 195 mounted on the line shaft 47. This cam has a notch 197 adapted to receive a roller 198 which is retained in the notch by a strong spring 199. A second spring 200 is connected eccentrically of the cam 195 and anchored to the frame of the machine. This structure is provided so that the machine will tend to halt at each revolution of the handle 19 and will always stop in the same position with the parts in a neutral position.

Fig. 23 shows a front closure member 202 having a lock 203. If this closure is used to lock the boxes 62, 63, or 162 a counter 204 may be placed thereon to record the opening of the machine.

Fig. 24 shows an additional device in connection with the segregating disc 10 which is intended for operation in event the coins become clogged on the segregating disc. This mechanism comprises the ratchet wheel 190 which is affixed on the shaft 14. A pawl 191 is pivoted on a reciprocating rod 192 which is adapted to be actuated by a handle 193 which protrudes from the side of the housing. The pawl 191 is held in position by a spring so that it is adapted to engage the ratchet wheel 190. In this manner operation of the plunger 193 serves to move the segregating disc 10 in a direction opposite to that in which it normally travels in the operation of the mechanism. The spring clutch 29 or drive in connection with this device permits this reverse movement of the segregating disc which will tend to dislodge coins which are out of proper position.

Conclusion

It seems apparent from the foregoing description that the mechanism provides a simple and economical device for receiving the fares and dispensing change to the passengers when desired without detracting the attention of the operator from traffic problems. In event a motor is provided as a substitute for the handle 19 it is intended that a button will be provided at a point adjacent the steering wheel or controller of the car so that the operator may readily press the button to cause actuation of the machine when fares are to be extruded and conducted to the machine or when change is desired by the passenger.

While the invention has been shown and described as being specifically embodied in a fare receiving and change making device which is adapted for use on street cars and buses, it is intended that the invention may be applied to various other lines of industries and it may be adapted for use in moving picture theatres, cafeterias, or any other type of business wherein money is to be paid in specific amounts. I do not, therefore, intend to be limited to a fare receiving apparatus as obviously the invention is of broader scope.

The drawings and descriptions set forth what is believed to be a simple, economical and practical application of the invention. It is intended, however, that in the future development of the idea that various alterations and modifications may be made therein without departing from the spirit of the invention as set forth in the appended claims. Such alterations may provide for dispensing tokens or other coins as desired.

Having thus described my invention what I claim is:

1. A fare box including in combination, a segregating disc whereby single coins are picked up, means on said disc to pick up different sized coins, means to receive the coins discharged from said disc, means connected with said discharge means adapted to separate the coins and cause disposition of different denominational coins in individual receptacles, and means to extrude and count the coins passing through each of said receptacles.

2. A segregating device for use with coin handling machines including a disc rotatable in a plane at an angle to the vertical and adapted to have coins deposited thereon, means to admit coins to said disc for deposit including a trap door, and means actuated by said coins accumulating on said disc to control said trap door.

3. A segregating device for use with coin handling machines including a disc rotatable in a plane at an angle to the vertical and adapted to have coins deposited thereon, means to admit coins to said disc for deposit, including a trap door, and means operable with said trap door to distribute the coins being deposited.

4. A segregrating device for use with coin handling machines including a disc rotatable in a plane at an angle to the vertical and adapted to have coins deposited thereon, means to agitate the coins deposited on the disc, said last means being operable periodically with the operation of the device, and additional means to independently actuate said agitating means.

5. A segregating device for use with coin handling machines including a disc rotatable in a plane at an angle to the vertical and adapted to above coins deposited thereon, means to admit coins to said disc for deposit, including a trap door, means to agitate the coins deposited on the disc and means controlling the opening of said door in accordance with the accumulation of coins on said disc.

6. A segregating device for use with coin handling machines including a disc rotatable in a plane at an angle to the vertical and adapted to have coins deposited thereon, means to admit coins to said disc for deposit, including a trap door, means to agitate the coins deposited on the disc, and additional means operable by said agitating means to control said trap door whereby entrance of additional coins to said disc is prohibited until the disc is cleared of an excess of coins.

7. In a change making machine, means to receive the deposited coin including a plunger, means to enter a recess in said plunger, and a passage in front of said plunger for coins whereby said second means is stopped from entering the recess in said plunger by the coin, and a third means to actuate said second means to contact the coin and move said plunger, and to subsequently move said plunger to discharge the coin from engagement by said second means, and means actuated by movement of the plunger to discharge change for the deposited coin.

HENRY WALTON WHITE.